United States Patent
Wang et al.

(10) Patent No.: US 9,769,704 B2
(45) Date of Patent: Sep. 19, 2017

(54) METHODS FOR ACCESSING TO BASE STATION THAT USES SACK MECHANISM AND APPARATUSES USING THE SAME

(71) Applicant: Intel Corporation, Santa Clara, CA (US)

(72) Inventors: Guotong Wang, Beijing (CN); Anthony Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 14/028,743

(22) Filed: Sep. 17, 2013

(65) Prior Publication Data

US 2014/0078963 A1    Mar. 20, 2014

Related U.S. Application Data

(60) Provisional application No. 61/702,084, filed on Sep. 17, 2012, provisional application No. 61/702,313, (Continued)

(51) Int. Cl.
*H04W 28/12* (2009.01)
*H04L 1/16* (2006.01)
(Continued)

(52) U.S. Cl.
CPC ........... *H04W 28/12* (2013.01); *H04L 1/1628* (2013.01); *H04L 1/1809* (2013.01); *H04W 48/16* (2013.01);
(Continued)

(58) Field of Classification Search
None
See application file for complete search history.

(56) References Cited

U.S. PATENT DOCUMENTS

2002/0080792 A1* 6/2002 Rosier .................. H04L 1/1614
370/394
2004/0138870 A1* 7/2004 Chan ................... G06F 9/45504
704/2
(Continued)

FOREIGN PATENT DOCUMENTS

| CN | 1768327 A | 5/2006 |
| CN | 1852079 A | 10/2006 |
| CN | 102369521 A | 3/2012 |

OTHER PUBLICATIONS

Office Action received for Chinese Patent Application No. 201310424441.X, mailed on Feb. 1, 2016, 7 pages. (Official copy only).

*Primary Examiner* — Faruk Hamza
*Assistant Examiner* — Cassandra Decker
(74) *Attorney, Agent, or Firm* — Schiff Hardin LLP (57) ABSTRACT

A method for a mobile station to access to a base station in a wireless communication system that uses selective acknowledgement mechanism, comprising: transmitting, an access probe from the mobile station to the base station, the access probe including a plurality of data frames; setting, a vector in the mobile station based on a message received from the base station, wherein the message indicates parts of the plurality of data frames in the access probe are not decoded by the base station; passing, the parts of the plurality of data frames that are not decoded by the base station from a MAC layer of the mobile station to a PHY layer of the mobile station according to the vector; and sending, by the mobile station to the base station, the parts of plurality of data frames that are not decoded by the base station.

7 Claims, 10 Drawing Sheets

Related U.S. Application Data filed on Sep. 18, 2012, provisional application No. 61/703,004, filed on Sep. 19, 2012, provisional application No. 61/713,381, filed on Oct. 12, 2012.

(51) Int. Cl.

| | | |
|---|---|---|
| *H04L 1/18* | (2006.01) | |
| *H04W 48/16* | (2009.01) | |
| *H04W 4/00* | (2009.01) | |
| *H04J 13/00* | (2011.01) | |
| *H04W 74/08* | (2009.01) | |

(52) U.S. Cl.
CPC .............. *H04J 13/00* (2013.01); *H04W 4/005* (2013.01); *H04W 74/08* (2013.01)

(56) References Cited

U.S. PATENT DOCUMENTS

| | | | |
|---|---|---|---|
| 2005/0157715 A1* | 7/2005 | Hiddink | H04L 1/0007 370/389 |
| 2006/0114936 A1* | 6/2006 | Paffen | H04W 28/14 370/469 |
| 2007/0110055 A1 | 5/2007 | Fischer et al. | |
| 2008/0212551 A1* | 9/2008 | Wu et al. | 370/342 |
| 2010/0254392 A1* | 10/2010 | Katar | H04L 12/417 370/400 |
| 2011/0258519 A1* | 10/2011 | Laevens | H04L 1/0057 714/776 |
| 2012/0195327 A1* | 8/2012 | Kim | H04L 1/0072 370/474 |
| 2013/0268820 A1* | 10/2013 | Sun et al. | 714/748 |

* cited by examiner

Before sending the first probe,
setting SACK[i]: ~610
SACK[i]=0, i=0,1...5

620~ 1st Enhanced Access Probe | P | 0 | 1 | 2 | 3 | 4 | 5 |

Frame 0, 2 and 5 are successfully received.
The SACK Order will set SELECTIVE_ACK_BIT_MASK to 101001 ~621

After receiving the SACK Order,
SACK[i] will be set to 101001 ~622

2nd Enhanced Access Probe

630~ MAC layer pass down the original frame 1, 3, 4

| P | SH | 1 | 3 | 4 |
          | 0 | 1 | 2 |

631~ Re-number from 0 to 2

Frame 1 (the original frame 3) is successfully received.
SACK Order will set SELECTIVE_ACK_BIT_MASK to 010 ~632

After receiving the SACK Order,
SACK[i] will be set to 101101 ~633

3rd Enhanced Access Probe

640~ MAC layer pass down the original frame 1, 4

| P | SH | 1 | 4 |
          | 0 | 1 |

641~ Re-number from 0 to 1

642~ Ack received access successful

| P | R-EACH Preamble |
| SH | SACK Header |

METHODS FOR ACCESSING TO BASE STATION THAT USES SACK MECHANISM AND APPARATUSES USING THE SAME

CROSS-REFERENCE TO RELATED APPLICATIONS

This application claims the benefit of the following U.S. Provisional Applications, which are herein incorporated by reference for all intents and purposes.

| SER. NO. | FILING DATE |
| --- | --- |
| 61/702,084 | Sept. 17, 2012 |
| 61/702,313 | Spet. 18, 2012 |
| 61/703,004 | Sept. 19, 2012 |
| 61/713,381 | Oct. 12, 2012 |

BACKGROUND OF THE INVENTION

Field of the Invention

This invention relates in general to the field of wireless communication, and more particularly to a new processing mechanism for SACK in CDMA 2000 1× wireless communication systems.

Description of the Related Art

In traditional TCP/IP wireless communication systems, if a data packet of a sequence is missing in transmission, more than one data packet may be sent again, which means the data packets that have been received may be retransmitted. As a result, the transmission efficiency is decreased significantly. To improve that situation, a Selective ACKnowledgment (SACK) mechanism is proposed. Under SACK mechanism, only those missing packets may be retransmitted, and all the other packets that have been received accurately and correctly may be skipped. Accordingly, the SACK mechanism is able to make sure the receiver has responded to the transmitter which packet is missing, which packet may be retransmitted, and which packets have been received and so on.

It is hoped that the SACK mechanism being introduced into CDMA 2000 1× wireless communication systems. And this kind of attempt is happened in 1× Rev.F wireless communication systems and the same. 1× Rev.F is a communication version of CDMA2000 1× wireless communication spec that focuses on optimizing and improving machine to machine (M2M) communications. However, a communication may not work normally even it introduces the SACK mechanism according to spec.

Accordingly, it is desired to provide a new processing mechanism for SACK that may make the retransmission accurately with no confusion in CDMA 2000 1× systems.

SUMMARY OF THE INVENTION

A method for a mobile station to access to a base station in a wireless communication system that uses selective acknowledgement mechanism, comprising: transmitting, an access probe from the mobile station to the base station, the access probe including a plurality of data frames; setting, a vector in the mobile station based on a message received from the base station, wherein the message indicates parts of the plurality of data frames in the access probe are not decoded by the base station; passing, the parts of the plurality of data frames that are not decoded by the base station from a MAC layer of the mobile station to a PHY layer of the mobile station according to the vector; and sending, by the mobile station to the base station, the parts of plurality of data frames that are not decoded by the base station.

A mobile station for accessing to a base station in a wireless communication system that uses selective acknowledgement mechanism, the mobile station comprising: a PHY layer, configured to transmit an access probe from the mobile station to the base station, and receive a message from the base station, wherein, the access probe including a plurality of data frames, and the message indicates parts of the plurality of data frames in the access probe are not decoded by the base station; and a MAC layer, coupled to the PHY layer, configured to set a vector in the mobile station based on the message, and pass the parts of the plurality of data frames that are not decoded by the base station to the PHY layer according to the vector.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
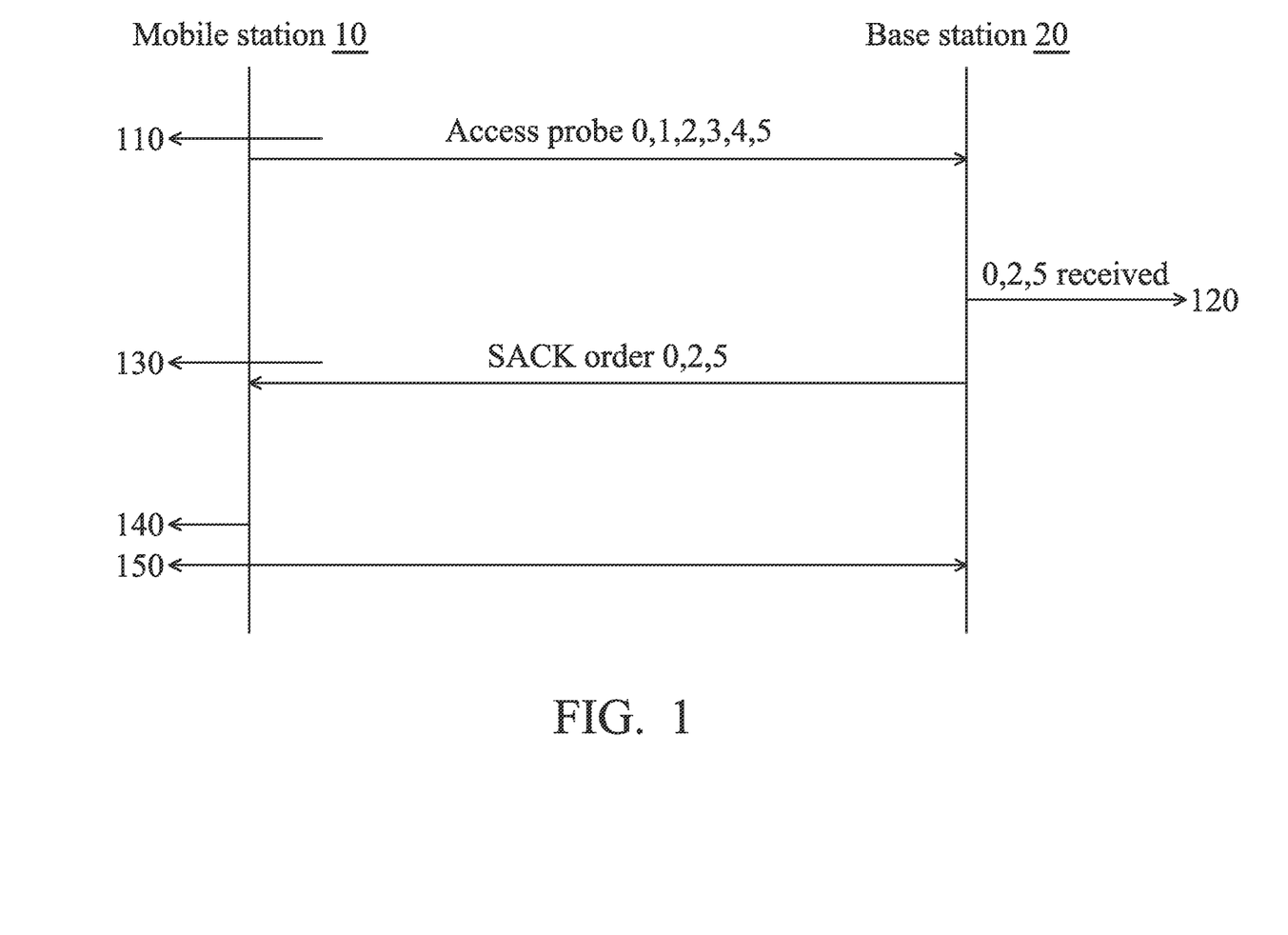
FIG. 1 is a figurative diagram illustrating an access process of the mobile station in conventional wireless communication system that use SACK mechanism.

FIG. 1 is a figurative diagram illustrating an access process of the mobile station in conventional wireless communication system that uses SACK mechanism. The mobile station 10 initiates an access attempt process to access the base station 20. When a mobile station wants to access a base station, the mobile station may initiate an access attempt. During an access attempt, the mobile station may send a first access probe to the base station. If the first access probe is not successfully decoded by the base station, the mobile station may send a second, a third, . . . a $N^{th}$ access probe until one access probe is successfully decoded. A Enhanced Access Channel (EACH) or a Reverse Enhanced Access Channel (REACH) is used by the mobile station to send those enhanced access probes. In step 110, mobile station 10 sends a first enhanced access probe on the REACH to base station 20, and the probe has a plurality of data frames. In the embodiment, assuming there are six REACH frames (frames 0, 1, 2, 3, 4, 5) in an enhanced access probe. However, there may be any number of data frames in an enhanced access probe according to the need of an application. SACK mechanism is introduced in CDMA 2000 systems, especially in M2M wireless communication systems that follow 1× Rev.F. According to the conventional SACK spec, there is a preamble and a SACK header in front of the data frame as shown in FIG. 2.

Figure 2:
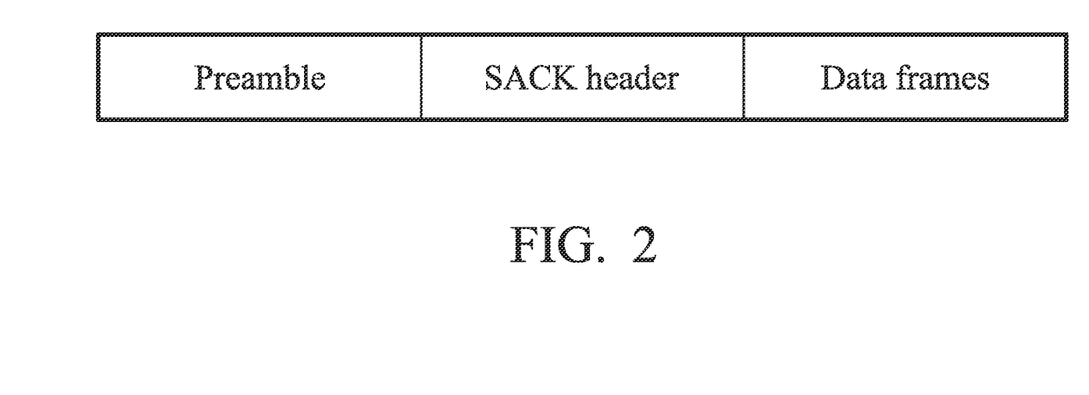
FIG. 2 is a figurative diagram illustrating the format of the enhanced access probe in conventional wireless communication system.

In FIG. 2, the SACK header contains a 2-bit field, which is set as "01" to indicate this is a header instead of a data frame and to indicate that the SACK is used. Therefore, in the $1^{st}$ transmission of the enhanced access probe ($1^{st}$ probe), there is a preamble, a SACK header and all the six frames (frames 0, 1, 2, 3, 4, 5). In step 120, assuming only frames 0, 2 and 5 are successfully decoded at the base station 20. According to the conventional SACK mechanism, the base station 20 may send back a SACK order to indicate which data frames are not successfully decoded after receiving the probe. So, in step 130, the base station 20 sends the $1^{st}$. SACK order to the mobile station 10 to indicate that data frames 1, 3, 4 are failed during transmissions. Therefore, in step 140, the mobile station 10 should prepare a second access probe with a preamble, a SACK header and data frames 1, 3, 4. Next, in step 150, the mobile station 10 may send this second access probe to base station 20. But, there may raise some problems when the mobile station 10 prepares the second access probe in step 140 based on conventional SACK mechanism. Those problems will be discussed subsequently in more detail.

Figure 3:
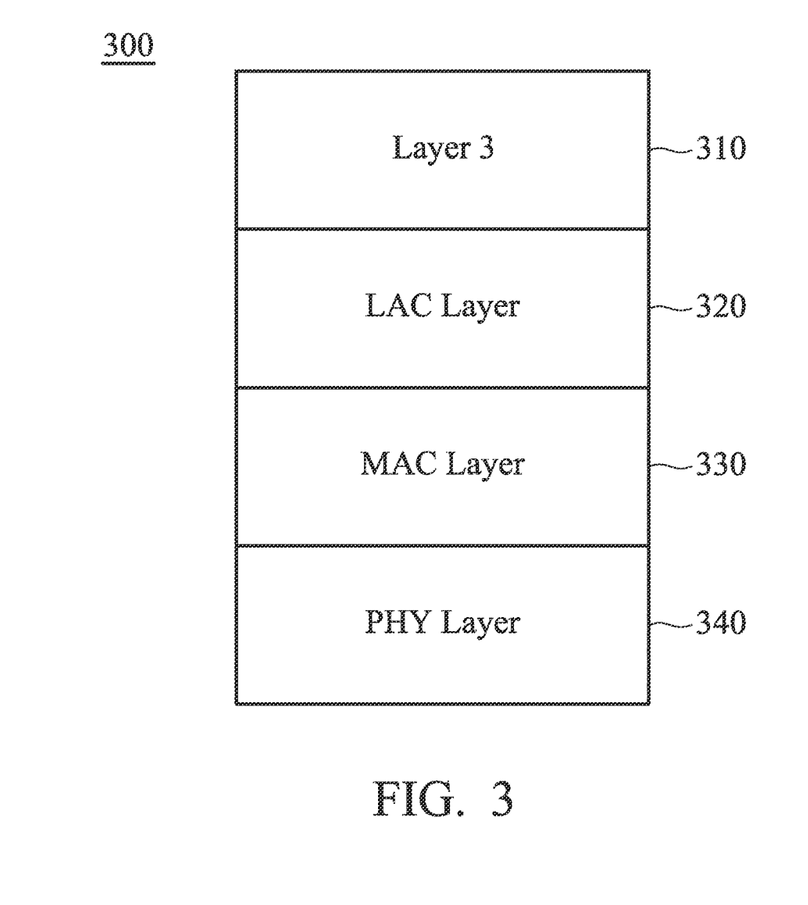
FIG. 3 is a schematic diagram of a protocol stack according to an embodiment of the invention.

FIG. 3 is a schematic diagram of a protocol stack according to an embodiment of the invention. The protocol stack 300 is incorporated with the PHY (physical) layer 310, the MAC (media access control) layer 320, the LAC (link access control) layer 330 and the layer three 340.

Figure 4A:
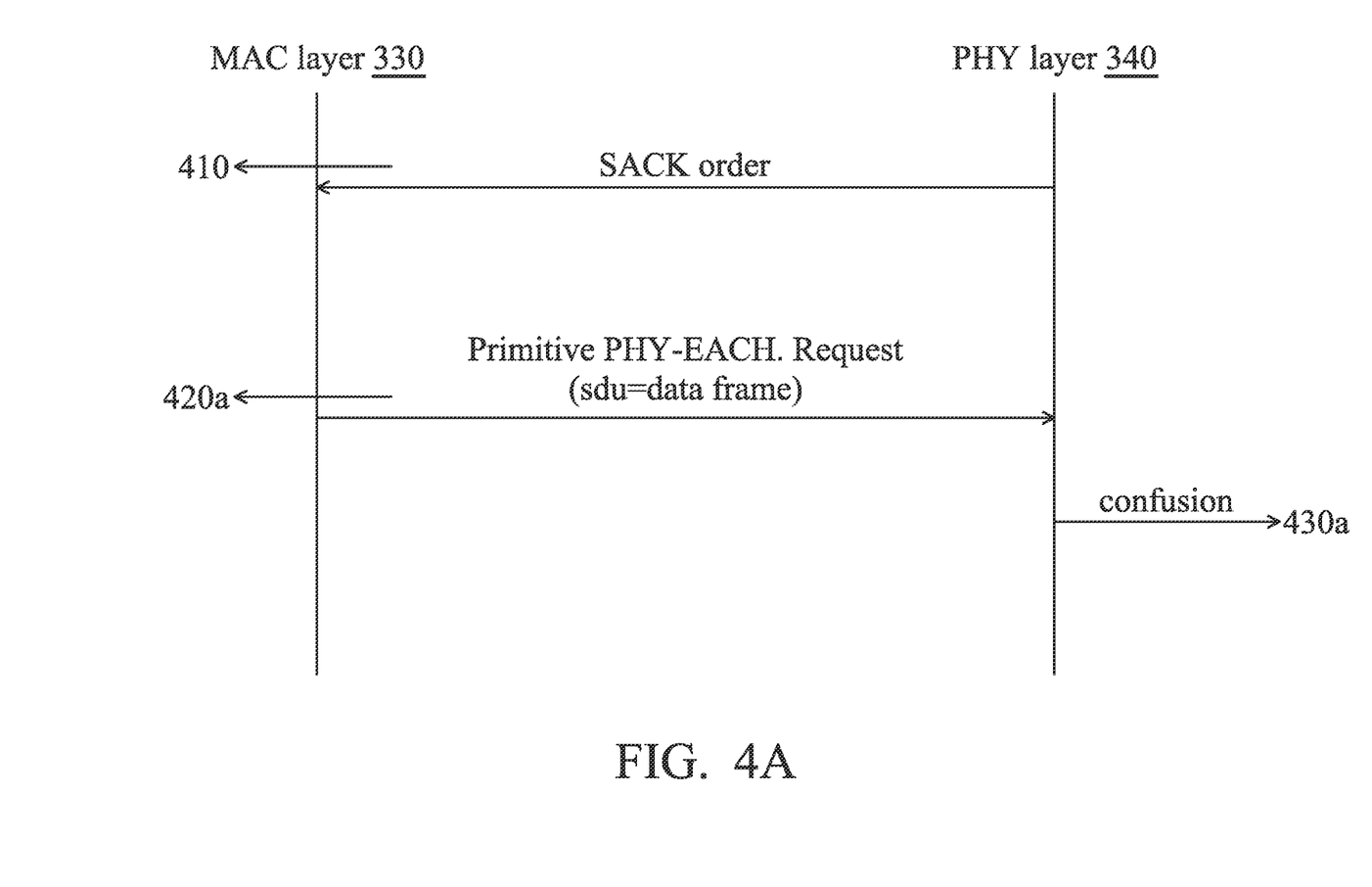
FIG. 4A is a figurative diagram illustrating an information transmitting process between the MAC layer and the PHY layer in mobile station in conventional wireless communication system that use SACK mechanism.
Figure 4B:
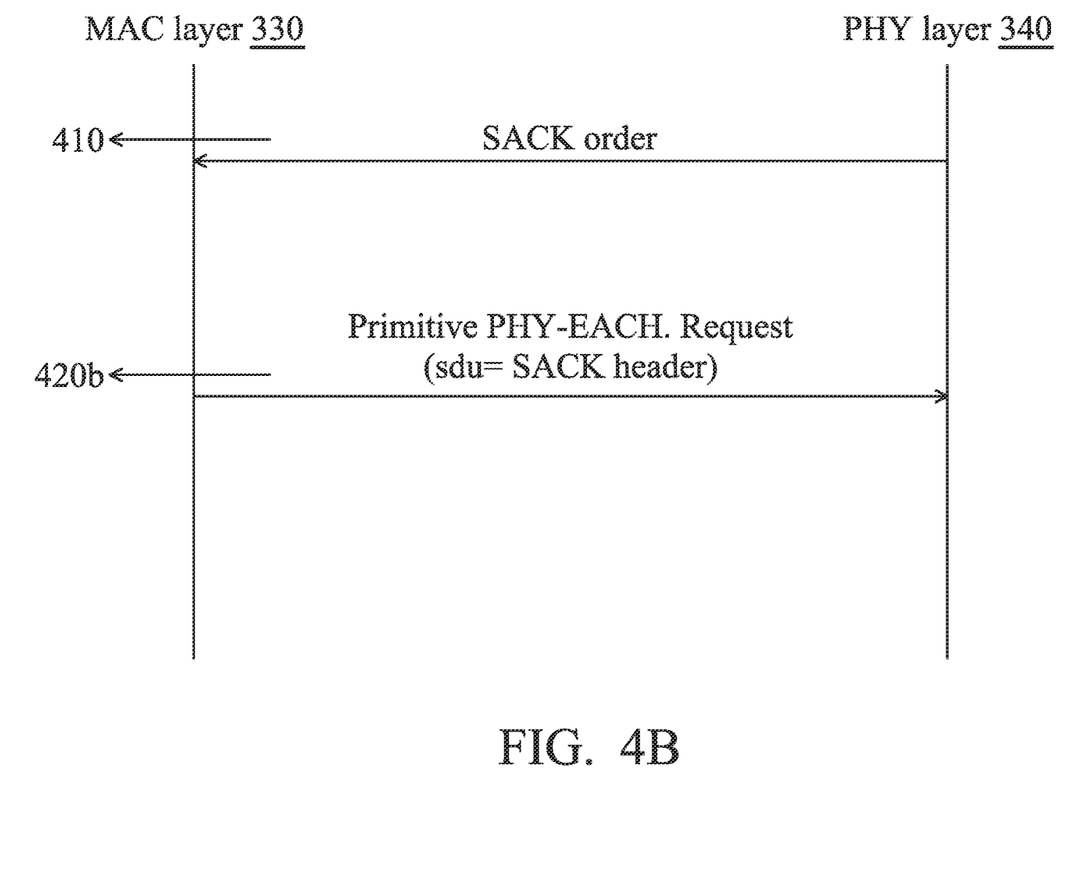
FIG. 4B is a figurative diagram illustrating an information transmitting process between the MAC layer and the PHY layer in mobile station according to an embodiment of the invention.
Figure 4C:
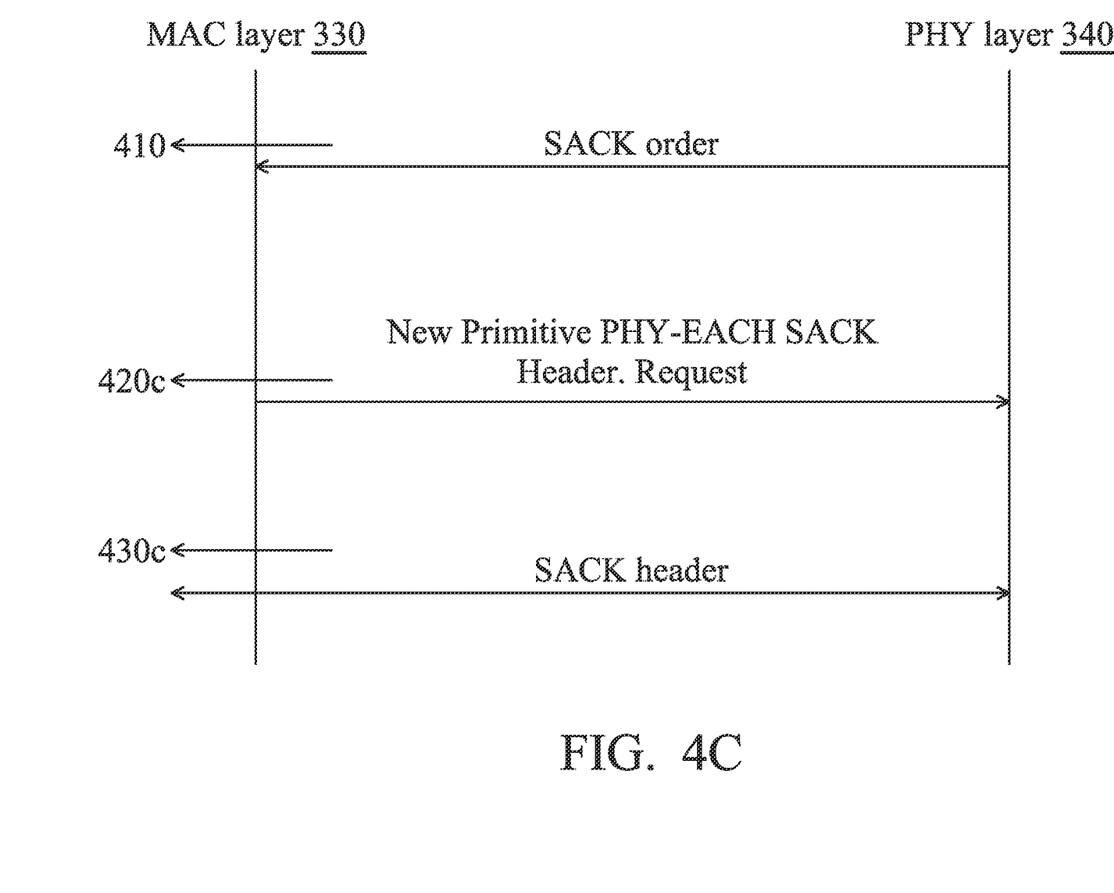
FIG. 4C is a figurative diagram illustrating an information transmitting process between the MAC layer and the PHY layer in mobile station according to another embodiment of the invention.

Now the problem of how to pass the SACK header is discussed by referring FIGS. 4A to 4C. FIG. 4A is a figurative diagram illustrating an information transmitting process between the MAC layer and the PHY layer in mobile station in conventional wireless communication system that uses SACK mechanism. FIG. 4A is a more detailed figurative diagram illustrating step 140 in FIG. 1. As shown in FIG. 4A, currently, SACK is handled at PHY layer 340 of the mobile station 10. In step 130 of FIG. 1, a SACK order is received by the mobile station 10. In step 410 of FIG. 4A, the PHY layer 340 passes this SACK order. After that, in step 420a, the MAC layer 320 of the mobile station 10 may pass down an instruction which is called a primitive to PHY layer 340. A primitive is an instruction that contains several instruction parameters to activate a series of specific operations so as to exchange information between different layers. Conventionally, the REACH data frame transmission is controlled by MAC layer via invoking primitive PHY-EACH.Request. This primitive PHY-EACH.Request may pass down data frames to PHY layer from MAC layer. Those parameters in PHY-EACH.Request include pwr_lvl, fpch_id, each_id, base_id, slot_offset, sdu, frame_duration, num_bits with more explanations in the following:

pwr_lvl stands for the power level of the transmitter and may be set to $PWR\_LVL_s$;

fpch_id stands for the ID of paging channel and may be set to $FCCCH\_ID_s$;

each_id stands for the ID of EACH and may be set to $EACH\_ID_s$;

base_id stands for the ID of base station and may be set to $BASE\_ID_s$;

slot_offset stands for the transmitting time offset and may be set to $ACC\_PREAMBLE\_TX\_SLOT_s$ mod 512;

sdu stands for the data frames that is transmitted;

frame_duration stands for the duration of the frame and may be set to the duration of the frame; and.

num_bits stands for the number of bits for the data frames.

As the parameter "sdu" in primitive PHY-EACH.Request stands for the data frames that is transmitted, the MAC layer 330 may pass only data frames with no SACK header to PHY layer 340. For example, at step 140, the mobile station 10 needs to prepare the $2^{nd}$ probe which contains the SACK header after the REACH preamble. But the MAC layer 330 may pass down the data frames after the REACH preamble according to the conventional primitive PHY-EACH.Request. This step is more detailed in FIG. 4A. In step 420a, frames are passed down to PHY layer 340 via the parameter sdu in primitive PHY-EACH.Request, but the PHY layer expects a SACK header, therefore, in step 430a, the PHY layer is confused. So, there needs a way to pass down the SACK header from the MAC layer to the PHY layer.

FIG. 4B is a figurative diagram illustrating an information transmitting process between the MAC layer and the PHY layer in mobile station according to an embodiment of the invention. As shown in FIG. 4B, The first solution is to configure MAC layer 330 to send to associated PHY layer 340 a PHY-EACH.Request primitive with some parameters being changed to express the SACK header. In this embodiment, the original primitive PHY-EACH.Request is still used. The changed parameter is sdu, which may be changed to stand for the SACK header. Then, after sending the preamble, the SACK header may be passed from MAC layer to PHY layer directly via the primitive PHY-EACH.Request.

The second solution is to introduce a new primitive, as shown in FIG. 4C. FIG. 4C is a figurative diagram illustrating an information transmitting process between the MAC layer and the PHY layer in mobile station according to another embodiment of the invention. After received the SACK order in step 410, this new primitive PHY-EACH-SACKHeader.Request is sent from MAC layer 330 to PHY layer 340 in step 420c. The new primitive PHY-EACH-SACKHeader.Request is used to indicate a SACK header may be sent after the preamble when needed. When this new primitive is used, the MAC layer is aware that SACK header is coming after the preamble. There might be many parameters in the new primitive. In one embodiment, those parameters are PHY-EACHSACKHeader.Request (pwr_lvl, fpch_id, each_id, base_id, slot_offset, frame_duration).

pwr_lvl stands for the power level of the transmitter and may be set to $PWR\_LVL_s$;

fpch_id stands for the ID of paging channel and may be set to FCCCH_ID$_s$;

each_id stands for the ID of EACH and may be set to EACH_ID$_s$;

base_id stands for the ID of base station and may be set to BASE_ID$_s$;

slot_offset stands for the transmitting time offset and may be set to ACC_PREAMBLE_TX_SLOT$_s$ mod 512; and frame_duration stands for the duration of the frame and may be set to the duration of the frame.

For the example in FIG. 4C, after the SACK order has been received in step 410, the MAC layer 330 may send a PHY-EACHSACKHeader.Request (pwr_lvl, fpch_id, each_id, base_id, slot_offset, frame_duration) to the PHY layer 340 to indicate that MAC layer 330 may send a SACK header next. In step 430c, the SACK header is passed to PHY layer 340.

Also, with the conventional spec, the PHY layer 340 in the mobile station 10 is in charge of storing all the REACH frames contained in the previous enhanced access probe, i.e., preambles, SACK headers, and all the data frames 0, 1, 2, 3, 4, 5. In the above two solutions, the SACK header may be moved from PHY layer to MAC layer, since the PHY entity has a limit memory space. And, the MAC layer may set the SACK header properly and pass down to PHY layer.

By using the above two solutions, the first problem about SACK header in step 140 of FIG. 1 is solved completely, and MAC layer is able to successfully send the SACK header to PHY layer. The disclosed embodiments in the application may also be used in any the CDMA 2000 1× systems that use SACK mechanism.

However, the second problem is about the fault frames. The MAC layer 330 is not aware how to pass the fault frames down to the PHY layer 340 merely in the conventional spec. For example, at step 150 in FIG. 1, according to the SACK, the mobile station 10 needs to send frames 1, 3 and 4 to the base station 20 without frames 0, 2 and 5. But, the MAC layer 330 may still pass all the six frames 0, 1, 2, 3, 4, 5 down to PHY layer 340 according to the conventional spec, which significantly causes confusion to PHY layer 340.

To solve this second problem, the MAC layer may maintain an vector during one access attempt with length equals to the number of the REACH frames contained in the first enhanced access probe. For example, the vector may be named SACK[i] during one access attempt. The length of SACK[i] is the number of the REACH frames contained in the very first enhanced access probe. At the beginning, i.e., before sending the first probe, the entire vector may be set to 0, i.e. SACK[i]=0 (i=0, 1 . . . N−1). After sending a probe, the mobile station may check whether a new SACK Order is received. If a new SACK Order is received, the MAC layer in the mobile station may set the value of SACK[i] based on the SACK Order. If SACK[i]==1 (i=0, 1 . . . N−1), it means the ith frame contained in the very first probe has been successfully decoded and may not be passed down to PHY layer again. Otherwise, the MAC layer may resend the ith frame to PHY. A SELECTIVE_ACK_BIT_MASK contained in the SACK Order indicates whether the corresponding frame is decoded correctly in the spec. After a new SACK Order is received, the MAC layer may set SACK[i] according to the SELECTIVE_ACK_BIT_MASK, as following:

```
j=0;
for(i=0; i<N; i++)
{
    if(SACK[i]==0)
    {
        SACK[i]= the value of the jth MSB of
                SELECTIVE_ACK_BIT_MASKs;
        j++;
    }
}
```

Figure 5A:
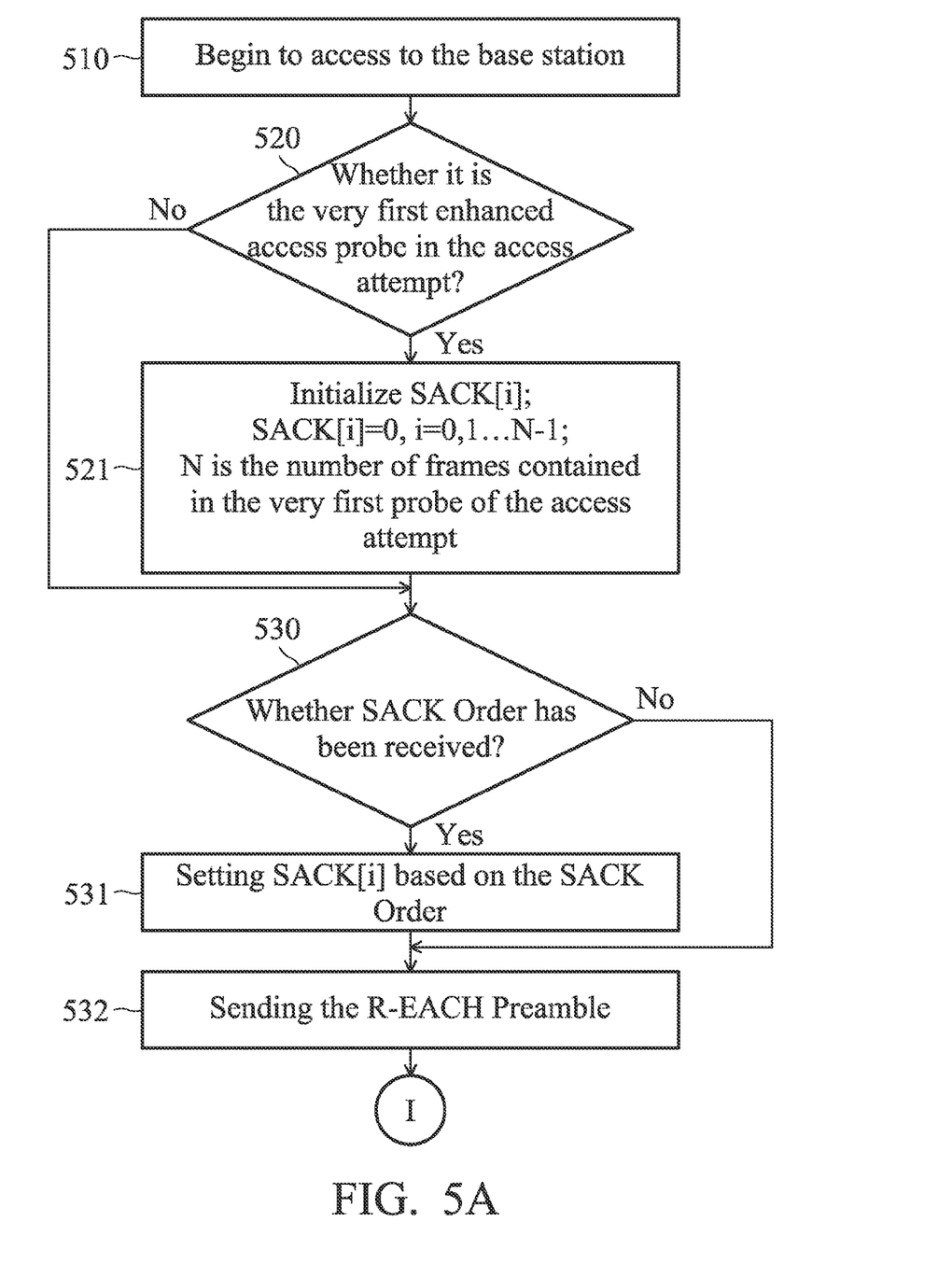
FIG. 5A combining 5B is a flow chart that shows the process of an access attempt in a wireless communication system that uses SACK mechanism according to an embodiment of the invention.
Figure 5B:
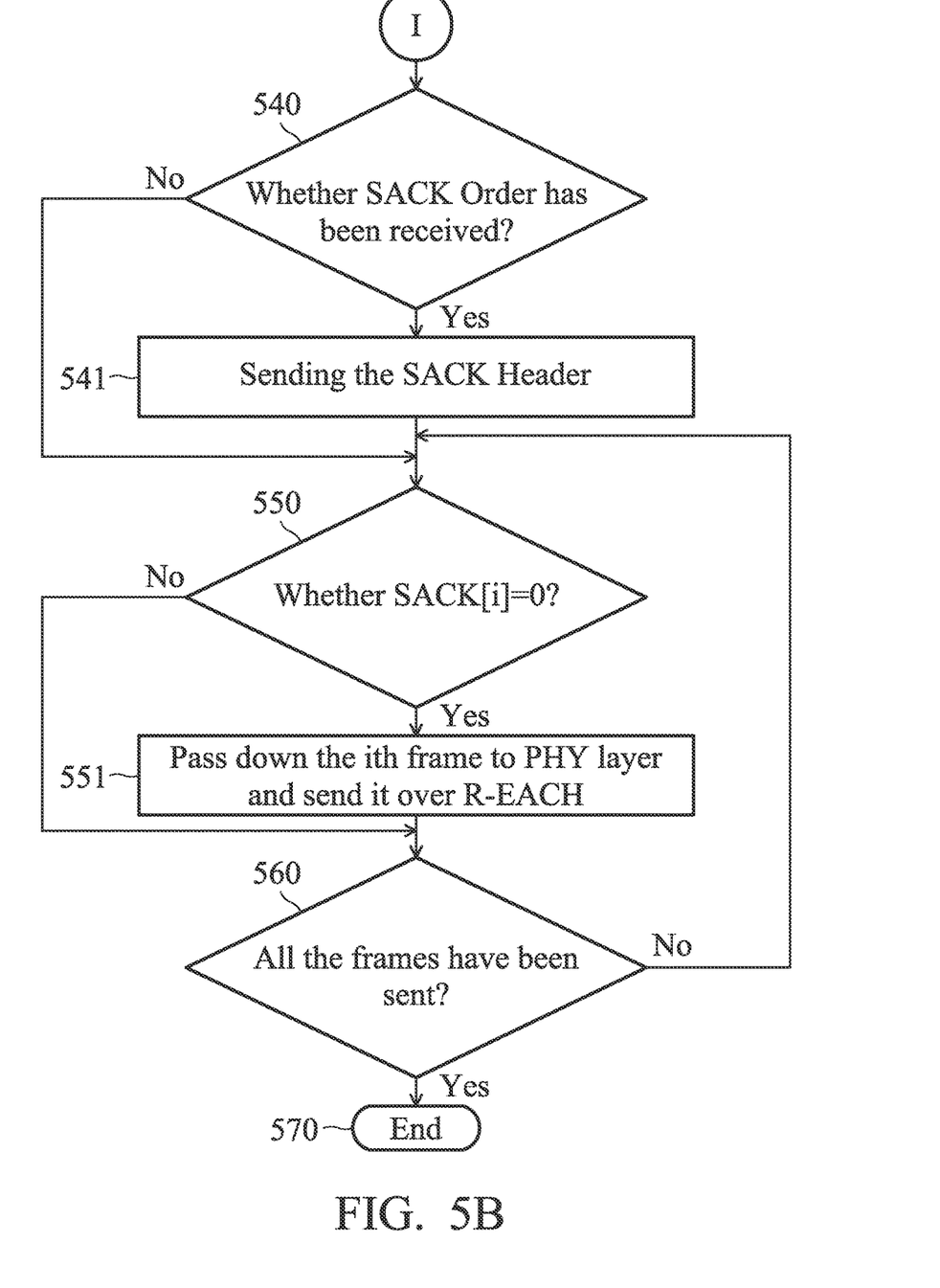

FIG. 5A combining 5B is a flow chart that shows the process of an access attempt in a wireless communication system that uses SACK mechanism according to one embodiment of the invention. In step 510, the mobile station begins to access to a base station. In step 520, MAC layer of the mobile station determines whether it is the very first enhanced access probe in the access attempt. If it is, then in step 521, the MAC layer initializes SACK [i]=0, i=0, 1, . . . N−1, wherein N is the number of frames contained in the very first probe of the access attempt, and the process goes to step 530. If the determination of step 520 is no, then the process goes to step 530 directly. In step 530, the mobile station determines whether a new SACK order has been received. If the determination is "yes" in step 530, then in step 531, MAC layer sets SACK [i] based on the SACK order, and the process goes to step 532. If the determination of step 530 is no, then the process goes to step 532 directly. In step 532, the mobile station sends the REACH preamble to the base station. In step 540, the mobile station determines whether SACK order has been received. If it has, then in step 541, the MAC layer sends the SACK header to the PHY layer. If the determination of step 540 is no, then the process goes to step 550 directly. In step 550, MAC layer determines whose entry value in SACK[i] is equal to zero, i.e., whether SACK[i]=0, i=0, 1, . . . , N−1. In step 551, MAC layer passes the ith frame, wherein SACK [i]=0, down to PHY layer, and the mobile station sends it over REACH. If in step 550, there is on entry value in SACK[i] equal to zero i.e., SACK[i]≠0, i=0, 1, . . . , N−1, then in step 560, the mobile station determines that if all the frames have been sent. If not all the frames have been sent, then the process goes to step 550 to make the determinations again, until all the frames have been sent. The process terminates at step 570.

Figure 6:
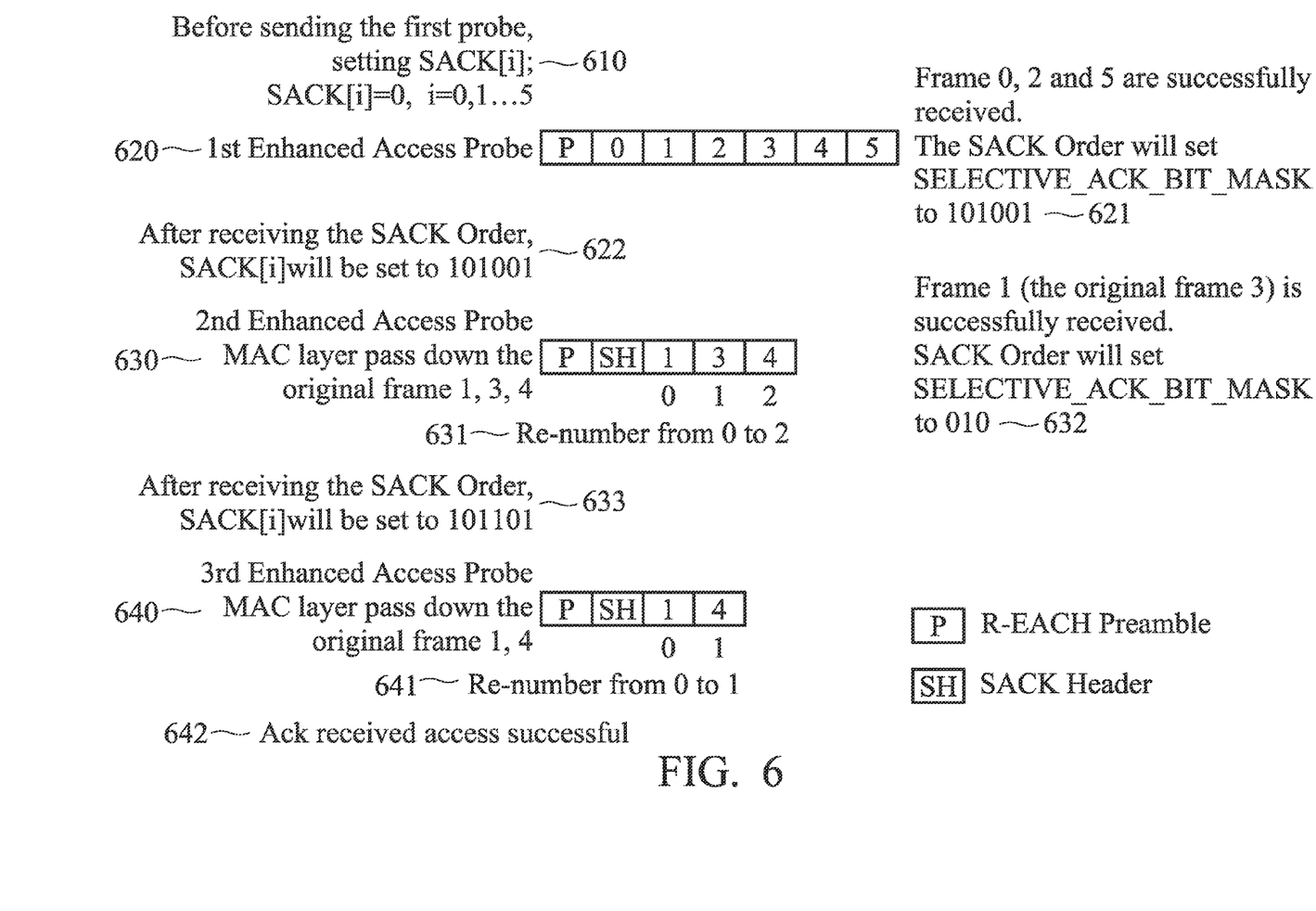
FIG. 6 is a figurative diagram illustrating the process of an access attempt in a wireless communication system that uses SACK mechanism according to one embodiment of the invention.

FIG. 6 is a figurative diagram illustrating the process of an access attempt in a wireless communication system that uses SACK mechanism according to one embodiment of the invention. From the sake of explanations, there are still six REACH frames (frames 0, 1, 2, 3, 4, 5) in the first probe of the access attempt as the example of FIG. 1. Please note there may be any number of data frames in an enhanced access probe according to the need of application. In step 610, before sending the first probe, the MAC layer initiates SACK[i] to set each entry value as zero, i.e., setting SACK [i]=0, i=0, 1, . . . 5, just as in step 521 of FIG. 5A combining 5B. In step 620, the mobile station initiates the 1$^{st}$ enhanced access probe. In step 621, the base station receives frames 0, 2 and 5 successfully. So, the base station may send a first SACK order with the SELECTIVE_ACK_BIT_MASK set to 101001 back to the mobile station. In step 622, the mobile station receives the first SACK order, and the MAC layer sets the corresponding entry values as one based on the first SACK order, i.e. setting SACK[i] to 101001 as in step 531 of FIG. 5A combining 5B. Then in step 630, the mobile station prepares to send the 2$^{nd}$ enhanced access probe, so the MAC layer passes down a SACK header (SH) to PHY layer to indicate that the coming frames are used for SACK transmitting. The MAC layer then passes down the original frame 1, 3, 4 to PHY layer based on the vector SACK[i], and the PHY layer sends them on REACH. In step 631, the frames in the $2^{nd}$ enhanced access probe may be renumbered=. In step 632, the base station receives frame 1 which is the original frame 3 successfully. Therefore, the base station may send a second SACK order with the SELECTIVE_ACK_BIT_MASK setting as 010 back to the mobile station. In step 633, after receiving the second SACK order, the MAC layer is informed of the original frame 3 have already been successfully decoded by the base station, and may set the SACK[i] to 101101 based on the second SACK order. Then in step 640, the mobile station prepares to send the $3^{rd}$ enhanced access probe, as shown in step 640, wherein the MAC layer passes down a SACK header (SH) and the original frame 1, 4 based on the SACK[i] to PHY layer, and the PHY layer sends them on REACH. In step 641, the frames in the $3^{rd}$ enhanced access probe may be renumbered. After that, the base station receives all the frames successfully and sends an ACK message back to the mobile station. In step 642, the mobile station receives the ACK message and the access process is successful.

The problem of how to pass the fault frames merely in step 150 of FIG. 1 is solved, and MAC layer is able to send the fault frames to PHY layer merely. This new processing mechanism may be used in any CDMA2000 1× wireless communication systems that employ the SACK mechanism to prevent those systems from confusions.

Another unexpected problem, the third problem, may be raised if some data frames at the end of the first probe are lost due to bad communication environment. The base station may be unaware of total numbers of data frames of the probe delivered from the mobile station, such that the base station is unable to respond the mobile station accurate situations of those lost frames. For example, the first probe consists of 6 REACH data frames as show in the example of FIG. 6. After the first probe, in step 621, the base station successfully decodes frames 0 and 2, frames 1 and 3 are failed, and frames 4~5 are lost. Thus the base station may think the total number of data frames is 4. Then, the base station sets the SACK order based on the probe length to 4 frames: 1010. In step 622, after receiving the first SACK Order, the mobile station may re-transmit frames 1 and 3. The mobile station doesn't know how to deal with frames 4~5. If frames 4 and 5 are not re-sent, then these two frames will be lost forever. If frames 4 and 5 are re-sent and are still lost, then the base station will think the message is correct if frames 1 and 3 are successfully decoded. So, it is very important for the base station to know the exact number of REACH data frames in the first access probe.

To solve the above problem, a new header may be introduced to indicate the total number of REACH data frames contained in the first access probe of an access attempt. This new header may be named as SACK Header Type II, and the conventional SACK header used in the conventional spec and the above embodiments is called as SACK Header Type I. The SACK Header Type II may be sent after the REACH preamble before the mobile station receives the first SACK Order. The base station may send the $1^{st}$ SACK Order only if this SACK Header Type II has been successfully decoded, i.e., the base station gets the information of the number of frames in the first probe. After receiving the first SACK Order at the mobile station, the mobile station may send SACK Header Type I instead of the SACK Header Type II in the next probes to achieve the SACK transmitting.

The MAC layer may use the following message format to assemble the SACK Header Type I.

TABLE 1

Format of the Selective Retransmission Header Type I

| Field | Length (bits) |
| --- | --- |
| SRT_HEADER_ID | 2 |
| SACK_CODE | 8 |
| RESERVED | As required |

Wherein:
SRT_HEADER ID—An identifier indicates this frame is a Selective Retransmission Header Type I. The mobile station may set this field to '10'.

SACK_CODE—A code from the base station uniquely identify the access attempt for EACH selective retransmission operation. The mobile station may set this field to SACK_CODES.

RESERVED—Reserved bits. The mobile station may set this field so that the total number of bits in this header fits the information bit number. The mobile station may set all the reserved bits to '0'.

In one embodiment of the application, the MAC layer may use the following message format to assemble the SACK Header Type II.

TABLE 2

Format of the Selective Retransmission Header Type II

| Field | Length (bits) |
| --- | --- |
| HEADER_IND | 2 |
| FRAME_NUM | 6 |

Wherein:
HEADER_IND
    An identifier indicates this frame is a Selective Retransmission Header Type II. The mobile station may set this field to '11'
FRAME_NUM
    To indicate the total number of REACH data frames contained in the message. The mobile station may set this field to total number of REACH data frames.

The HEADER_IND field may always be set to '11' to differentiate with SACK Header type I '10' and data frame '00' and '01'. The new header SACK Header type II may be defined in PHY or MAC layer. But it is better to put it in MAC layer spec. If the new header SACK Header type II is defined in MAC layer, the conventional primitive PHY-EACH.Request may be reused with the sdu parameter set to the new header SACK Header type II. Or, new primitive may be introduced to pass down the new header to physical layer.

If the mobile station decides to use SACK mechanism, it may include the new header SACK Header type II right after the REACH preamble in the enhanced access probes before receiving the first SACK Order. And, before receiving the SACK Order, all the frames may be transmitted in the probe. The base station may not send SACK Order back to the mobile station until the new header is decoded. And, after decoding the new header, the base station may set the SACK order accordingly. After receiving the SACK Order, the mobile station may send the conventional header, SACK header type I, after the REACH preamble instead of the new header SACK header type II. The following processing is the same as above embodiments illustrated with reference of FIGS. 4-6. The above process may be illuminated more detailed with reference to FIG. 7.

Figure 7:
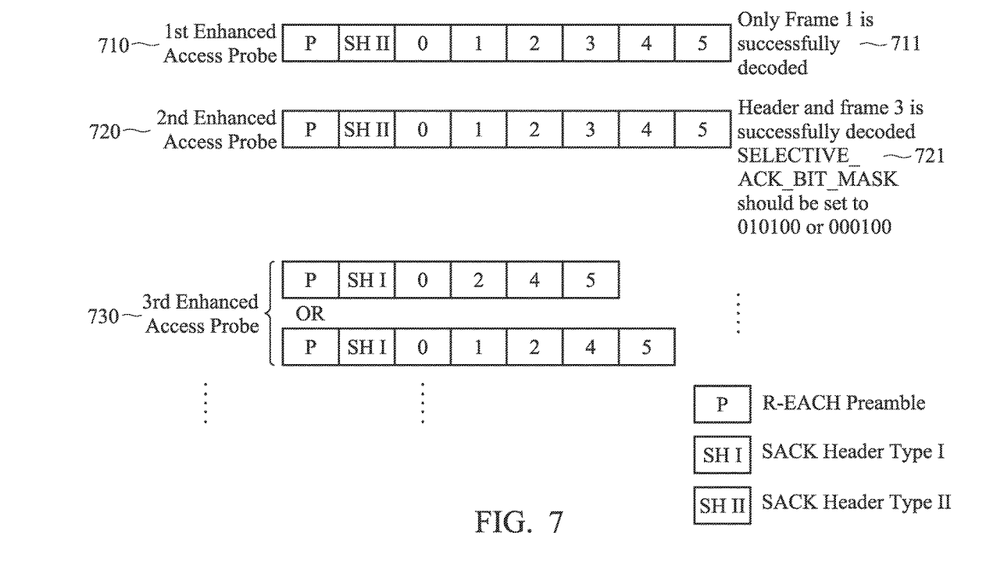
FIG. 7 is a figurative diagram illustrating the process of an access attempt in a wireless communication system that uses SACK mechanism according to another embodiment of the invention.

FIG. 7 is a figurative diagram illustrating the process of an access attempt in a wireless communication system that uses SACK mechanism according to another embodiment of the invention. For the sake of explanations, there are still six REACH frames (frames 0, 1, 2, 3, 4, 5) in the first probe in the access attempt as the examples of FIG. 1 and FIG. 6. Please note there may be any number of data frames in an enhanced access probe. In step 710, before sending the first probe, the MAC layer sets SACK[i], i.e., sets SACK [i]=0, i=0, 1, . . . 5, and the mobile station initiates the $1^{st}$ enhanced access probe, wherein the $1^{st}$ enhanced access probe has a REACH preamble (P), a SACK header type II (SHII) and the data frames. In step 711, the base station only receives frame 1 successfully, which means the base station does not receive the SHII, and the base station does not know how many data frames in the $1^{st}$ access probe. So, the base station may not send a SACK order back to the mobile station. In step 720, the mobile station initiates the $2^{nd}$ enhanced access probe, which still has a REACH preamble (P), a SACK header type II (SHII) and the data frames. In step 721, the base station receives the SHII and frame 3 successfully, so the base station knows that there are six data frames in the probe and some of them are missing. Then, the base station may have two options in setting the SELECTIVE_ACK_BIT_MASK in the first SACK order. Option 1 is to set the SELECTIVE_ACK_BIT_MASK to 010100, which indicates the frames that have been successfully decoded in the $1^{st}$ and $2^{nd}$ probes. Option 2 is to set the SELECTIVE_ACK_BIT_MASK to 000100, which indicates the frame that have been successfully decoded just in the $1^{st}$ probe. In step 730, the mobile station received the first SACK order and reset the SACK[i] accordingly, and then initiates the $3^{rd}$ enhanced access probe. Since the base station have already know the number of the frames in the first probe, so $3^{rd}$ probe comprise SACK header type I (SHI). Then, the process goes as described in FIG. 6.

There is an alternative solution to inform the base station of the frame number in the first probe, that is, the mobile station keeps checking the length of SELECTIVE_ACK_BIT_MASK in the SACK order with the number of data frames in the previous probe. After receiving SACK Order, the mobile station checks the length of SELECTIVE_ACK_BIT_MASK with the number of data frames in the previous probe. If it mismatches, the mobile station knows that some frames are lost, and the mobile station may ignore the SACK Order and resends the previous probe. The base station may re-determine the number of data frames in the probe. If it matches, it means the base station knows the number of frames. The mobile station may resend the failed frames indicated by the SACK order.

Now, the base station is able to know the total number of data frames of the first probe. This new processing mechanism may be used in any CDMA2000 1× wireless communication systems that use the SACK mechanism to prevent those systems from confusion.

Those skilled in the art may appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A method for a mobile station to access to a base station in a wireless communication system that uses selective acknowledgement mechanism, comprising:
   transmitting a first access probe by the mobile station to the base station, the first access probe includes a plurality of data frames and a first header that indicates a total number of frames of the transmitted plurality of data frames;
   receiving a message from the base station upon full decoding of the first header, wherein the message indicates decoding of one or more frames of the transmitted plurality of data frames of the first access probe;
   setting a vector by a medium access control (MAC) layer of the mobile station to specify non-decoded frame or frames of the transmitted plurality of data frames based on the message received from the base station;
   sending the specified non-decoded frame or frames of the plurality of data frames from the MAC layer of the mobile station to a PHY layer of the mobile station; and
   transmitting by the mobile station of a second access probe to the base station, the second access probe includes the non-decoded frame or frames of the plurality of data frames from the first access probe, and a second header that indicates an access attempt—identification for each selective retransmission of the plurality of data frames, wherein the second header does not include an indication of the number of frames transmitted in the first or second access probe, and the total number of frames of the first access probe is not re-transmitted on the second access probe.

2. The method of claim 1, wherein the vector has a plurality of bits, wherein each bit of the plurality of bits corresponds to a respective data frame of the plurality of data frames.

3. The method of claim 2, wherein each bit of the plurality of bits is initially set to zero and accordingly changed to a high value based from the indicated decoded one or more frame or frames from the first access probe.

4. The method of claim 1, wherein the selective retransmission indicates transmission of non-decoded frame or frames of the plurality of data frames from the first access probe.

5. A mobile station for accessing a base station in a wireless communication system using a selective acknowledgement mechanism, the mobile station comprising:
   a PHY layer, configured to transmit an access probe from the mobile station to the base station, and receive a message from the base station upon a full decoding of the first header and based from the transmitted access probe, wherein the access probe includes a transmitted plurality of data frames and a first header that indicates a total number of frames of the transmitted plurality of data frames, and the message indicates frame or frames of the access probe that were decoded by the base station; and
   a MAC layer circuitry which is coupled to the PHY layer, the MAC layer circuitry configured to set bit values of a vector in the mobile station to specify non-decoded frame or frames of the transmitted plurality of data frames, wherein the vector includes a plurality of bits, wherein each bit of the plurality of bits corresponds to a respective frame of the plurality of data frames of the access probe, wherein the MAC layer circuitry sends the non-decoded frame or frames of the transmitted plurality of data frames through another access probe, wherein a second header on the another access probe indicates an access attempt—identification for each selective retransmission of the plurality of data frames, wherein the second header does not include an indication of the number of frames transmitted in the access probe or the another access probe, and the total number of frames of the first access probe is not re-transmitted on the another access probe.

6. The mobile station of claim 5, wherein the MAC layer circuitry is configured to set the plurality of bits to zero prior to transmission of the access probe.

7. The mobile station of claim 5, wherein the PHY layer transmits the non-decoded frame or frames of the plurality of data frames of the access probe during a selective retransmission.

* * * * *